US008923521B2

(12) United States Patent
Beguet et al.

(10) Patent No.: US 8,923,521 B2
(45) Date of Patent: Dec. 30, 2014

(54) DEVICE FOR LOCALIZING ACOUSTIC SOURCES AND/OR MEASURING THEIR INTENSITIES

(75) Inventors: Bernard Beguet, Saint Bel (FR); Lucille Lamotte, Lachassagne (FR); Charles Cariou, Salvetat Saint Gilles (FR)

(73) Assignees: MicroDB (FR); Airbus Operations SAS (FR)

( * ) Notice: Subject to any disclaimer, the term of this patent is extended or adjusted under 35 U.S.C. 154(b) by 235 days.

(21) Appl. No.: 13/366,736

(22) Filed: Feb. 6, 2012

(65) Prior Publication Data

US 2012/0201391 A1 Aug. 9, 2012

(30) Foreign Application Priority Data

Feb. 4, 2011 (FR) ...................... 11 50925

(51) Int. Cl.
*H04R 29/00* (2006.01)
*G01S 3/803* (2006.01)
*G01S 3/801* (2006.01)
*G03H 3/00* (2006.01)
*H04R 1/40* (2006.01)

(52) U.S. Cl.
CPC ............... *G01S 3/8036* (2013.01); *G01S 3/801* (2013.01); *G03H 3/00* (2013.01); *H04R 1/406* (2013.01); *H04R 2420/07* (2013.01)
USPC ................. 381/56; 381/92; 381/122; 381/124

(58) Field of Classification Search
CPC .......... H04B 11/00; H04R 1/406; H04R 3/00; G01S 3/8036; G01S 3/8083; G01S 3/8086; G03H 3/00; G03H 3/12; G01V 1/00
USPC .......... 381/56, 92, 122, 124; 367/8, 118, 119, 367/124; 73/603
See application file for complete search history.

(56) References Cited

U.S. PATENT DOCUMENTS

| | | | | |
|---|---|---|---|---|
| 3,573,400 A | * | 4/1971 | Sessler et al. | 381/357 |
| 4,393,270 A | * | 7/1983 | van den Berg | 381/98 |
| 5,260,920 A | * | 11/1993 | Ide et al. | 369/5 |
| 5,357,484 A | * | 10/1994 | Bates et al. | 367/118 |
| 7,817,804 B2 | * | 10/2010 | Beguet | 381/92 |
| 2005/0163330 A1 | | 7/2005 | Beguet | |
| 2005/0225497 A1 | * | 10/2005 | Christensen et al. | 343/893 |
| 2010/0008517 A1 | | 1/2010 | Elko et al. | |
| 2012/0128174 A1 | * | 5/2012 | Tammi et al. | 381/92 |

FOREIGN PATENT DOCUMENTS

EP 1557688 A1 7/2005

OTHER PUBLICATIONS

Jin Craig, et al. "Optimisation of Co-centred Rigid and Open Spherical Microphone Arrays", AES Convention 120; May 2006, AES, 60 East 42nd Street, Room 2520 New York New York 10165-2520 USA, XP040507658.

(Continued)

*Primary Examiner* — Davetta W Goins
*Assistant Examiner* — Amir Etesam
(74) *Attorney, Agent, or Firm* — Cantor Colburn LLP

(57) ABSTRACT

Device for localizing acoustic sources and/or measuring their intensities, intended in particular to be used in confined spaces, the device including at least one acoustic antenna having a first series of microphones delimiting a first volume, and a second series of microphones delimiting a volume containing at least substantially the first series of microphones.

9 Claims, 5 Drawing Sheets

(56) References Cited

OTHER PUBLICATIONS

Abhaya Parthy et a. "Acoustic holography with a concentric rigid and open spherical microphone array", Acoustics, Speach and Signal Processing, 2009, ICASSP 2009, Apr. 19, 2009, pp. 2173-2176, IEEE International Conference on, IEEE, Piscataway, NJ, USA, XP031459694.

Preliminary Search Report issued Oct. 12, 2011 re: FR 1150925, pp. 3; citing: Parthy et al. "Acoustic holograpy . . . ", Craig et al. "Optimisation of Co-centered . . . ", US 2010/008517 A1, US 2005/163330 A1 and Zotkin et al. "Plane-Wave Decomposition . . . ".

D N Zotkin et al. "Plane-Wave Decomposition of Acoustical Scenes Via Spherical and Cylindrical Microphone Arrays", IEEE Transactions on Audio, Speech and Language Processing, Jan. 1, 2010, pp. 2-16, vol. 18, No. 1, IEEE Service Center, New York, NY USA, XP011329106.

* cited by examiner

DEVICE FOR LOCALIZING ACOUSTIC SOURCES AND/OR MEASURING THEIR INTENSITIES

TECHNICAL FIELD

The present invention relates to a device for localizing acoustic sources and/or measuring their intensities.

BRIEF DISCUSSION OF RELATED ART

In industry, during the development of a new product, creating acoustic comfort for the end user has become as important an issue as the visual appearance of the product. This issue is of even greater importance if the product in question is a transport vehicle such as an airplane, where the operation of the aircraft is a source of significant noise nuisance to passengers. In order to better identify and limit acoustic sources which are the origin of this nuisance noise, the use of a device to localize acoustic sources and/or measure their intensity comprising at least one acoustic antenna is known.

Such an acoustic localization device can be used to determine the exact location and intensity of acoustic sources and thereby to establish the most appropriate method to limit or eliminate them. To enable this calculation, the acoustic antenna of such a localization device comprises a series of microphones linked to a system to process the signals from the localization device. This processing system is able to reproduce, via calculation, the distribution of acoustic sources.

For confined spaces such as the passenger compartment of an aircraft, this type of localization device must allow an accurate localization of acoustic sources regardless of their location in the confined space. The use of a device comprising an acoustic antenna device with a series of microphones flush on the rigid surface of a sphere is known in the state of the art, and in particular European Patent EP 1 557 688. Such an acoustic antenna, using a three-dimensional distribution of microphones and acoustic focalization, meaning the weighted calculation of signals taking into account the propagation between the calculation point and the point of measurement, the beamformer type, for a distribution of possible source or calculation points, including the diffraction of the rigid spherical body, enables calculation of the exact spatial localization of each acoustic source.

However, the resolution of such a localization device is limited and determined by the volume of the acoustic antenna. If such a localization device is to be used for measurement within confined spaces, the size of the rigid acoustic antennas used are limited, so as not to modify the acoustic field emitted by the antennas, and therefore the spatial resolution of the localization device. Moreover, the increased volume of such an antenna leads to a substantial increase in the number of microphones for operation on the same frequency range. It would therefore be advantageous to use microphones distributed over a larger non-rigid surface, however, the localization dynamic would be reduced and this would lead to the detection of "phantom" sources.

BRIEF SUMMARY

The goal of the present invention is to overcome this inconvenience, while operating on the same frequency range.

The technical issue behind the invention comprises providing a device to localize acoustic sources and/or measure their intensities designed for use in confined spaces comparable to any geometric distribution of source points comprising an acoustic antenna which enables optimal spatial resolution and optimal dynamics over a large frequency range without interference to the emitted acoustic field, with regards to a device comprising an acoustic antenna of prior art occupying the same volume and operating in the same frequency range. This system must also have the advantage of being able to localize sources in any volume and provide the benefit of this in relation to the acoustical holography method with spherical wave working from the measurement of an acoustic field projected onto a uniquely spherical volume.

For this purpose, the invention relates to a device for localizing acoustic sources and/or measuring their intensities, intended in particular to be used in confined spaces, the aforementioned localization device comprises at least one acoustic antenna with at least one series of microphones distributed over a closed surface delimiting the first volume, the localization device being characterized in that the antenna also comprises at least one second series of microphones delimiting a volume containing at least substantially the first series of microphones and in that the device also comprises a processing system comprising means of focalization linked to a means of interspectral calculation, designed to process via focalization, over a distribution of possible source points, acoustic pressure measurement signals generated by the first and second series of microphones from the or each acoustic antenna and to carry out a multiplication operation, meaning a calculation of the interspectral sum of the acoustic pressure backpropagation values, for each calculation source point obtained for the first and the second series of microphones for the or each acoustic antenna.

The provision of a second series of microphones delimiting a volume substantially containing the first series of microphones, allows a substantial increase in the volume of the acoustic antenna, with a limited number of microphones. Thereby a device for localizing acoustic sources and/or measuring their intensities is obtained, enabling the localization of acoustic sources with an improved spatial resolution compared to a device comprising an acoustic antenna of prior art. The interspectral processing of the focalized pressures makes it possible to maintain a good resolution linked to the second series of microphones for a greater volume and to maintain good dynamics related to the elimination of the non-coherent phantom sources between two distributions of microphones.

Preferably, the volume delimited by the second series of microphones contains the entirety of the first series of microphones.

Such a provision of the first series of microphones makes it possible to limit the volume of the acoustic antenna to the one delimited by the second closed surface.

According to a preferred embodiment, at least one of the volumes delimited by the two series of microphones is substantially spherical.

The provision of the microphones over a spherical closed surface enables, for acoustic focalization according to signals emitted from these microphones, the use of a breakdown into spherical harmonics, thus simplifying the retropropagation from the measured pressure around a rigid volume.

Advantageously, the first and the second volumes are substantially spherical and concentric.

The provision of the first and the second series of microphones according to the first and the second spherical volumes respectively, enables, for an acoustic focalization of the signals emitted from the microphones of the first and second series of microphones, the use of a breakdown into spherical harmonics, thus simplifying focalization for the first series of microphones.

According to another embodiment, at least one of the first and the second volumes is substantially cylindrical.

The provision of the microphones over a surface delimiting one cylindrical volume enables, for acoustic focalizing according to signals emitted from these microphones, the use of a breakdown into spherical harmonics, thus simplifying the focalization process. Moreover, such a surface makes it possible to widen the measured area in one direction by adapting to the lengthened geometry of a confined space Advantageously, the first and the second volumes are substantially cylindrical, and the cylinders are coaxial.

The provision of the microphones over two cylindrical surfaces enables, for acoustic focalizing according to signals emitted from these microphones, the use of a breakdown into spherical harmonics, thus simplifying the focalization process.

Advantageously, the closed surface is a rigid support, preferably covered by an absorbent material, on which the first series of microphones are appreciably flush and the microphones of the second series are supported by a frame.

The use of a rigid support for the first series of microphones, and of a frame forming an extension of the rigid support for the second series of microphones, makes it possible to combine the benefits of the provision of microphones on a rigid support with those of a provision of microphones over an open support which is a frame, namely, improved dynamics and spatial resolution respectively.

Preferably, the processing system comprises means of coherence calculation designed to calculate, for each calculation source point, a level of coherence between the back-propagated acoustic pressure values obtained from each series of microphones of the or each acoustic antenna using the means of focalization.

Such means of coherence calculation enable the detection of "phantom" sources linked to the phenomena of reverberations in the confined spaces in which the localization device is used.

The invention also refers to a process for the localization of acoustic sources and/or measurement of their intensities using a localization device according to the invention and comprising the following stages:
  receiving acoustic pressure measurement signals generated by the first and second series of microphones of the or each acoustic antenna,
  performing focalization processing for each calculation source point, independent of signals generated by the first series and the second series of microphones of the or each acoustic antenna,
  calculating the interspectral sum, for each calculation source point, of the acoustic pressure values obtained for the first series and the second series of microphones of the or each acoustic antenna during the focalization processing.

Such a localization procedure enables the localization of acoustic sources and/or the measurement of their intensities with improved resolution and better dynamics, as it benefits from the use of an acoustic antenna comprising two series of microphones positioned over a first and a second volume which at least substantially includes the first.

Advantageously, the procedure for the localization of acoustic sources and/or measurement of their intensities uses a localization device whose means of focalization is designed to perform, for several calculation source points discretizing the acoustic emission space and for each series of microphones of the or each acoustic antenna, focalization processing using the acoustic pressure measurement signals generated by the corresponding series of microphones in order to obtain, for each calculation source point, an acoustic pressure value for the first and the second series of microphones of the or each acoustic antenna, and in each calculation source point, to calculate the interspectral sum of the acoustic pressure values obtained for the first and second series of the or each acoustic antenna, and also comprising the following stage:
  to determine a level of coherence between the acoustic pressure values obtained from each series of microphones for each calculation source point using the means of focalization.

Such a localization process enables a localization of the acoustic sources and/or measurement of their intensities with detection of "phantom" sources linked to the phenomena of reverberations in the confined spaces of undefined geometry in which the localization device is used.

BRIEF DESCRIPTION OF THE DRAWINGS

In any event the invention will be readily understood using the description which follows as a reference to the annexed schematic drawing which shows, as non-exhaustive examples, three embodiments of this device for localizing acoustic sources and/or measuring their intensities and the process for the localization of acoustic sources and/or measuring their intensities.

DETAILED DESCRIPTION

A device for localizing acoustic sources and/or measuring their intensities is used to determine the exact location and/or intensity of each acoustic source 2 in a confined space 3, such as the cockpit of an airplane.

The localization device comprises in particular at least one acoustic antenna 4.

Figure 1:
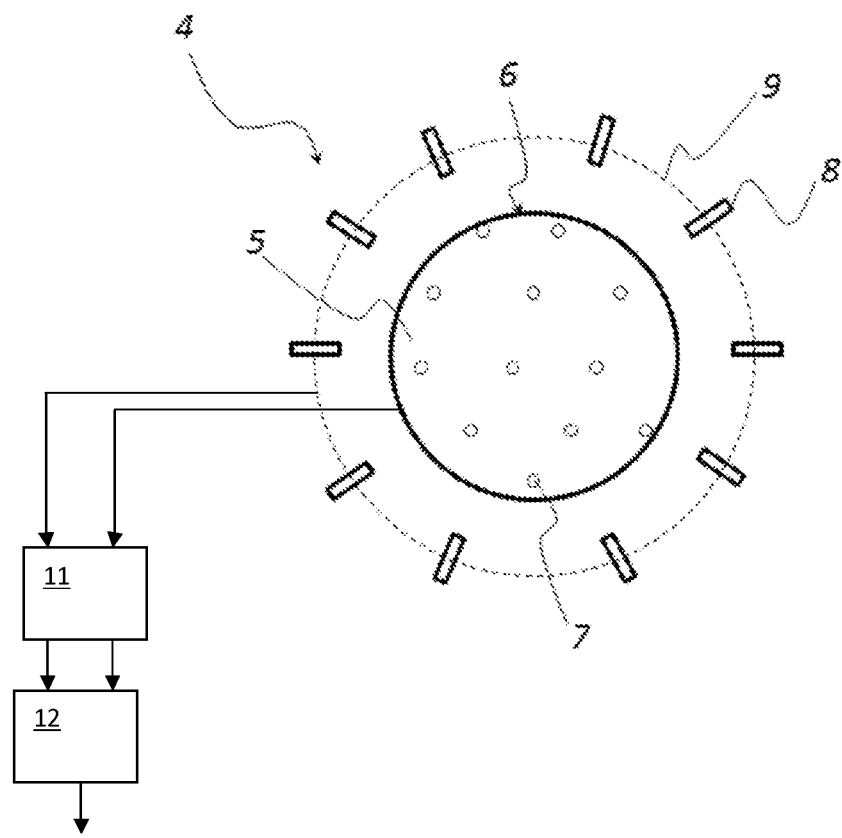
FIG. 1 is a schematic view of a first embodiment of the acoustic antenna.

According to the first embodiment of the localization device, the acoustic antenna 4 comprises a rigid support 5 as shown in FIG. 1.

This rigid support 5 has a substantially spherical shape. Surface 6 of the rigid support has a first closed surface delimiting a first volume. According to a non-illustrated embodiment of the invention, rigid support 5 is covered with a reflective material.

The acoustic antenna 4 also comprises a first series of microphones 7. The microphones 7 are assembled on the rigid support 5 and are appreciably flush to the surface 6 of the rigid support 5. The microphones 7 are preferably distributed substantially evenly on the rigid support 5.

The acoustic antenna 4 also comprises a second series of microphones 8. The acoustic antenna 4 also comprises a frame 9 for the microphones 8. The frame 9 is designed so that it is sound permeable.

The frame 9 for microphones 8 has a substantially spherical general shape and is concentric with rigid support 5. Frame 9 for the second series of microphones 8 has a diameter substantially greater than that of the rigid support 5.

Frame 9 for microphones 8 has a second closed surface delimiting a second volume. The second volume represented by the frame contains the first series of microphones 7.

Microphones 8 are mounted on frame 9. The microphones 8 are distributed substantially evenly on frame 9.

The localization device also comprises a processing system (not shown). This processing system is preferably in the form of either an independent calculation unit connected to a computer, or a computer equipped with means for the acquisition of acoustic pressure measurement signals generated by the microphones.

The processing system is connected to the acoustic antenna 4 so as to receive the acoustic pressure measurement signals generated by the first and second series of microphones 7, 8 of the acoustic antenna 4.

The connection between the processing system and the first and second series of microphones 7, 8 can be wired or advantageously wireless, such as a Wi-Fi or radio frequency transmission.

The processing system handles the signals from each series of microphones 7, 8 in a distribution of several calculation source points from the confined space 3 so as to create a hologram of the acoustic sources 2 present in this confined space 3.

The processing system comprises means of focalization 11 of the acoustic pressure measurement signals generated by the first and second series of microphones 7, 8 of the acoustic antenna 4.

The means of focalization are designed to carry out, for several calculation points and for each series of microphones 7, 8 of the acoustic antenna 4, a focalization process using the acoustic pressure measurement signals generated by the corresponding series of microphones 7, 8. The focalization processing using the means of focalization is carried out in order to obtain, for each calculation point, an acoustic pressure value of the first and second series of microphones 7, 8 from the acoustic antenna 4 for each calculation point, and for each calculation point to calculate the interspectral sum of the acoustic pressure values obtained for the first and second series of microphones 7, 8.

The processing system also comprises means of coherence calculation (not represented) designed to calculate, for each possible calculation source point, a level of coherence between the acoustic pressure values obtained from each series of microphones 7, 8 of the acoustic antenna 4 using the means of focalization.

The processing system is arranged so as to process the signals resulting from the first and the second series of microphones 7, 8 according to a procedure for the localization of acoustic sources and/or measuring their intensities illustrated on the flowchart and comprising the stages comprising:
  A) receiving acoustic pressure measurement signals generated by the first and second series of microphones 7, 8 of the acoustic antenna 4,
  B) performing focalization processing for each possible source distribution point, independent of acoustic pressure measurement signals generated by the first series and second series of microphones 7, 8 of the acoustic antenna 4,
  C) calculating the interspectral sum, for each calculation source point, of the acoustic pressure values obtained for the first series and second series of microphones 7, 8 of the acoustic antenna 4 during the focalization processing,
  D) calculating for each calculation source point, a level of coherence between the acoustic pressure values obtained from the first series and second series of microphones 7, 8 of the acoustic antenna 4 during the focalization processing.
  E) displaying or mapping a hologram showing the acoustic pressure values and the levels of coherence obtained for each calculation point of the distribution of possible sources, acoustic sources 2 being shown by the maximum levels of acoustic pressure having a high level of coherence.

Such a procedure allows a precise localization of the acoustic sources 2 while making it possible to exclude "phantom" sources 10 linked to the phenomena of reverberations and to the processing artifacts using calculated levels of coherence.

Figure 2:
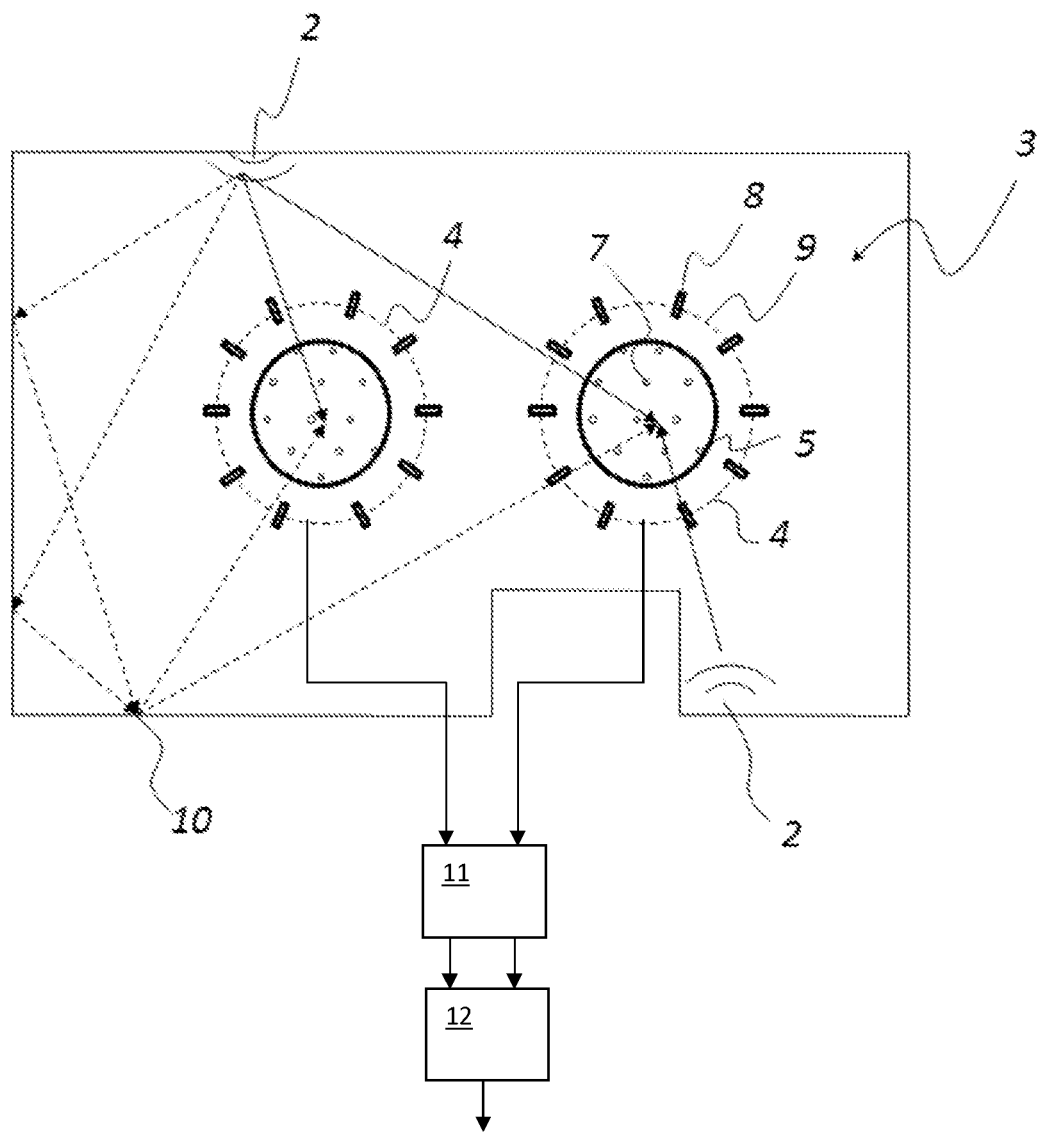
FIG. 2 is a schematic view in context of two acoustic antennas.

During the use of such a localization device in confined spaces 3, such as the one illustrated by FIG. 2, the procedure comprises placing the acoustic antenna 4 in the confined space 3 at a distance from the edges of the confined space 3 and implementing the process of localization of acoustic sources and/or measurement of their intensities in order to obtain a hologram of the acoustic sources 2.

Figure 3:
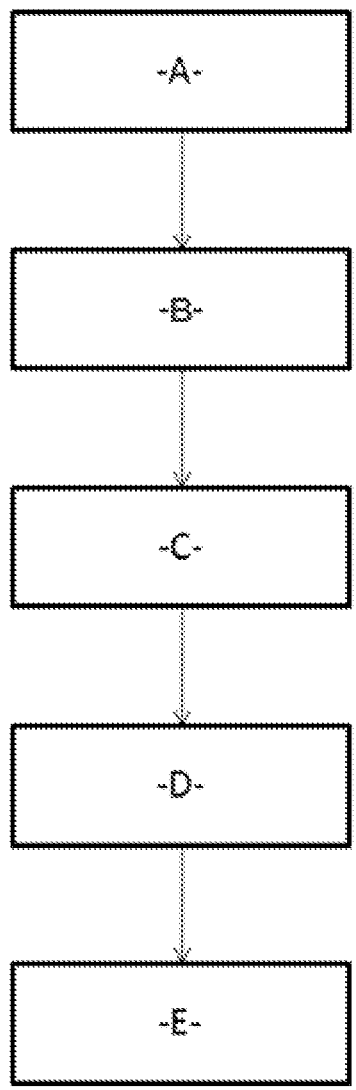
FIG. 3 is a flow chart showing the process for the localization of acoustic sources and/or measuring their intensities.

According to an embodiment of the invention illustrated in FIG. 3, the localization device can be equipped with two acoustic antennas 4 to offer a better spatial and dynamic resolution. According to this embodiment of the invention, the processing system is arranged to receive signals from each series of microphones 7, 8 of each acoustic antenna 4 separately.

The means of focalization could be a calculation unit 11, for example, and separately processes each calculation source point for the first and second series of microphones 7, 8 of each of the two acoustic antennas 4. Each focalization calculation is independent from the measure of the other microphone series. The acoustic pressure values thus obtained for the first and second series of microphones 7, 8 of each acoustic antenna 4 are multiplied in an interspectral calculation via a computing unit 12, as seen in FIG. 1, so as to define an acoustic pressure value in each calculation source point.

The means of coherence calculation determine the coherence level for each calculation source point from the acoustic pressure values calculated for the first and second series of microphones 7, 8 of each of the two acoustic antennas 4 using the means of focalization.

The means of processing thus enables a hologram showing the acoustic pressure values and the obtained levels of coherence, to be obtained for each calculation source point.

The localization device can also be equipped with an acoustic antenna 4 of another form.

Figure 4:
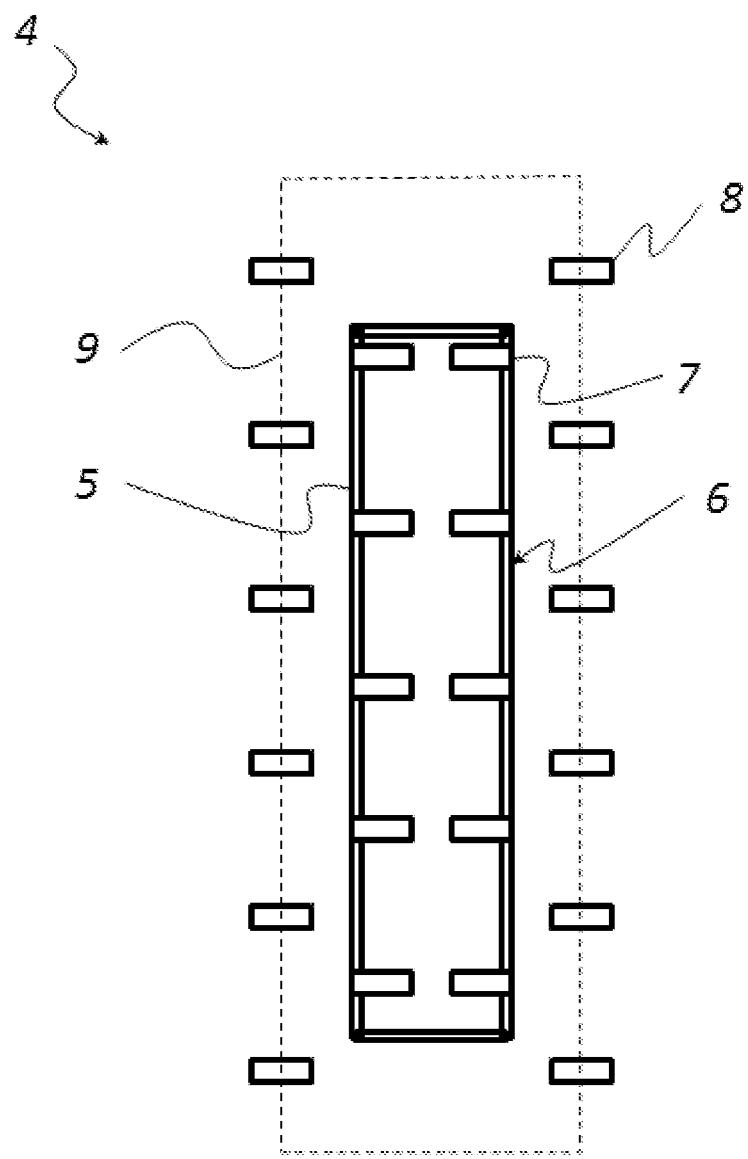
FIG. 4 is a schematic sectional view of a second embodiment of the acoustic antenna.
Figure 5:
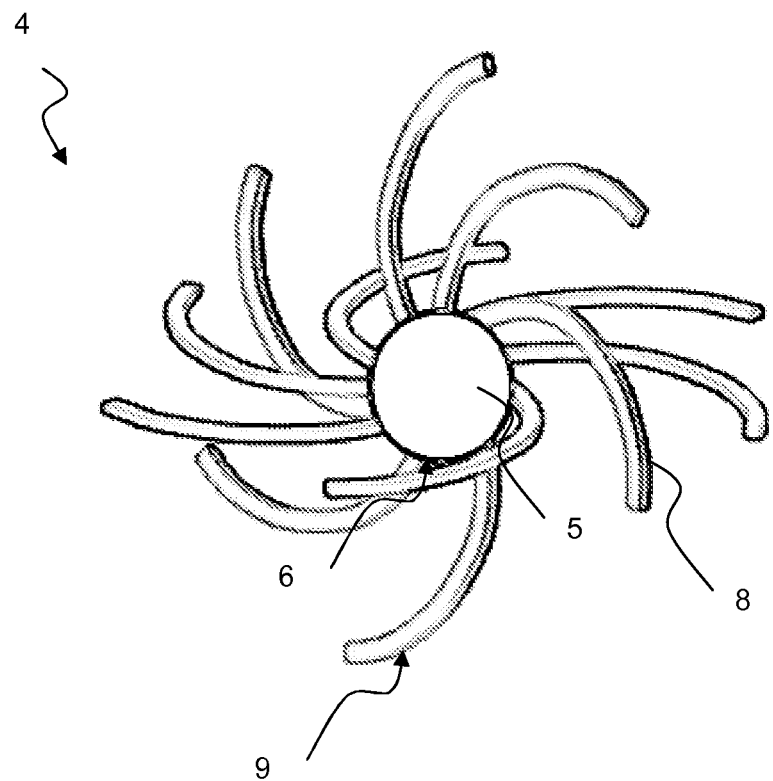
FIG. 5 is a schematic view of a third embodiment of the acoustic antenna.

Such an acoustic antenna 4 is illustrated in FIGS. 4 and 5, the numerical references used are the same as those used for the first embodiment of the acoustic antenna 4.

Such an acoustic antenna 4 is differentiated from the acoustic antenna 4 according to the first embodiment in that the volumes delimited by the two series of microphones are not spherical and in that the rigid support 5 of the first series of microphones 7 and the frame 9 of the second series of microphones 8 represent different spherical shapes.

According to this embodiment, the first and the second series of microphones delimit substantially cylindrical and coaxial volumes.

In the embodiment represented in FIG. 5, the first series of microphones 7 is arranged on a sphere 6, from which extends curved arms 9, in the shape of circular arcs, forming a frame onto which microphones 8 are mounted, with a number of at least one per arm, to form a second series of microphones or a third or a fourth series of microphones, according to the number of microphones positioned on each arm.

A localization device comprising such an acoustic antenna 4 functions in a similar way to that of a localization device comprising an acoustic antenna 4 according to the first embodiment.

In the same way a localization device can comprise two acoustic antennas 4 according to the second embodiment or one acoustic antenna 4 according to the first embodiment in combination with one acoustic antenna 4 according to the second or the third embodiment without that changing the general principle of operation of the localization device.

It goes without saying, the invention is not only limited to the embodiments of this device for localizing acoustic sources and/or measuring their intensities, described above as examples, on the contrary, it also encompasses all alternative embodiments. Thus various series of microphones could define volumes different to those described previously, with the possibility of partial overlap between two successive volumes.

The invention claimed is:

1. A device for localizing acoustic sources and/or measuring their intensities, intended in particular to be used in confined spaces, the localization device comprising:
   at least one acoustic antenna comprising at least a first series of microphones distributed over a closed surface delimiting a first volume and at least one second series of microphones delimiting a volume containing at least substantially the first series of microphones, wherein the volume delimited by the second series of microphones contains the entirety of the first series of microphones;
   a processing system comprising means of focalization linked to means of interspectral calculation, designed to use focalization over a distribution of possible source points to process acoustic pressure measurement signals generated by the first and second series of microphones from the or each acoustic antenna and to carry out a multiplication operation, comprising a calculation of an interspectral sum of acoustic pressure backpropagation values, for each calculation source point obtained for the first and the second series of microphones for the or each acoustic antenna.

2. Localization device according to claim 1, wherein at least one of the volumes delimited by the two series of microphones is substantially spherical.

3. Localization device according to claim 2, wherein the first and the second volumes are substantially spherical and concentric.

4. Localization device according to claim 1, wherein at least one of the first and second volumes is substantially cylindrical.

5. Localization device according to claim 1, wherein the first and the second volumes are substantially cylindrical, and the cylinders are coaxial.

6. Localization device according to claim 1, wherein the closed surface is a rigid support, covered by an absorbent material, on which the first series of microphones are appreciably flush and the microphones of the second series are supported by a frame.

7. Localization device according to claim 1, wherein the processing system comprises means of coherence calculation designed to calculate, for each calculation source point, a level of coherence between the backpropagated acoustic pressure values obtained from each series of microphones of the or each acoustic antenna using the means of focalization.

8. Localization device according to claim 6, wherein the localization device comprises two acoustic antennas wherein the first and the second volumes are substantially spherical and concentric.

9. Localization device according to claim 7, wherein the localization device comprises two acoustic antennas wherein the first and the second volumes are substantially spherical and concentric.

* * * * *